United States Patent [19]

Takazawa et al.

[11] 4,353,631
[45] Oct. 12, 1982

[54] EXPOSURE INFORMATION INPUT CIRCUIT FOR ELECTRIC SHUTTER

[75] Inventors: Yuzuru Takazawa; Shinji Nagaoka, both of Yotsukaido, Japan

[73] Assignee: Seiko Koki Kabushiki Kaisha, Japan

[21] Appl. No.: 143,912

[22] Filed: Apr. 25, 1980

[30] Foreign Application Priority Data

Apr. 28, 1979 [JP] Japan .................................. 54-52863

[51] Int. Cl.³ .............................................. G03B 17/18
[52] U.S. Cl. ...................................... 354/51; 354/60 L
[58] Field of Search .................... 354/23 R, 84, 50, 51, 354/60 L, 53–57, 289

[56] References Cited

U.S. PATENT DOCUMENTS

| | | | |
|---|---|---|---|
| 3,605,589 | 9/1971 | Minegishi et al. | 354/51 |
| 3,698,299 | 10/1972 | Arisaka et al. | 354/60 L X |
| 3,824,606 | 7/1974 | Yoshiyama | 354/60 L X |
| 4,027,314 | 5/1977 | Iguchi et al. | 354/60 L X |
| 4,077,043 | 2/1978 | Nanba | 354/60 L X |

Primary Examiner—L. T. Hix
Assistant Examiner—W. J. Brady
Attorney, Agent, or Firm—Robert E. Burns; Emmanuel J. Lobato; Bruce L. Adams

[57] ABSTRACT

In an electric shutter having a photoelectric element, a time constant circuit for use in controlling exposure and a low brightness sensor circuit for use in connecting said photoelectric element in series with a comparator resistance and in sensing a low brightness in reference to its partial voltage, an exposure information input circuit for setting one reference voltage to be applied for determining said trigger levels of the two sensor circuits so as to feed exposure information such as film sensitivity, etc. and further having a function correction circuit between said reference voltage and one of said two sensor circuits.

15 Claims, 8 Drawing Figures

EXPOSURE INFORMATION INPUT CIRCUIT FOR ELECTRIC SHUTTER

BACKGROUND OF THE INVENTION

This invention relates to a circuit for use in an electric shutter which is operated to feed exposure information such as ASA sensitivity or aperture information, except brightness information.

As a method for electrically processing the exposure information, it has been proposed to set a resistance value to correspond to each element of exposure information, such as ASA sensitivity or aperture setting and to develop electrical signals using the set resistance values for applying exposure information electrically. However, in a shutter of the type having a low brightness sensor circuit, except a time constant circuit, for use in controlling the shutter, the exposure information should be simultaneously and efficiently fed to these two circuits. The exposure time t will be expressed as follows:

$$t = RC \ln \frac{E}{E - V} \quad (1)$$

where,
R: a resistance value of the photoelectric element
C: an electrostatic capacitance of the capacitor
E: a voltage of the power supply
V: a reference voltage The value of t is used in the case that an integrating circuit comprised of the photoelectric element and the capacitor is used as a shutter control time constant circuit. To the contrary, in the case that a photoelectric element and a comparison resistance are connected in series to form a low brightness sensor circuit, and its partial voltage is compared with a reference voltage, a value of the resistance R of the photoelectric element when the reference voltage corresponds with the output voltage indicating the brightness is as follows:

$$R = R_O \frac{E - V}{V} \quad (2)$$

where,
$R_O$: a resistance value of the comparison resistance
E: a power supply voltage
V: a reference voltage For example, when ASA sensitivity exposure information is fed as a reference voltage V, this reference voltage V should be set such that the exposure time t assumes the values 2t, t, ½t, ¼t . . . as ASA sensitivity is varied among the corresponding values 50, 100, 200, 400 . . . To the contrary, in a low brightness sensor circuit, the reference voltage V should be set such that the resistance R of the photoelectric element assumes the value ½R, R, 2R, 4R . . . in response to the variations of ASA sensitivity as described above. However, as is apparent from equations (1) and (2) above, the equation describing the time constant circuit is a logarithmic function and the equation describing the low brightness sensor circuit is a fractional function. Therefore, it is not possible to construct the two circuits described above by using the same reference voltages V.

SUMMARY OF THE INVENTION

It is an object of the present invention to solve or overcome the above described disadvantages by providing a shutter circuit that includes a function correction circuit arranged between an exposure information setting circuit and a time constant circuit or a low brightness sensor circuit and wherein variations in the output from said two circuits are found in response to the exposure information or reference voltage V representative of the exposure information.

DETAILED DESCRIPTION OF THE PREFERRED EMBODIMENTS OF THE PRESENT INVENTION

Figure 1:
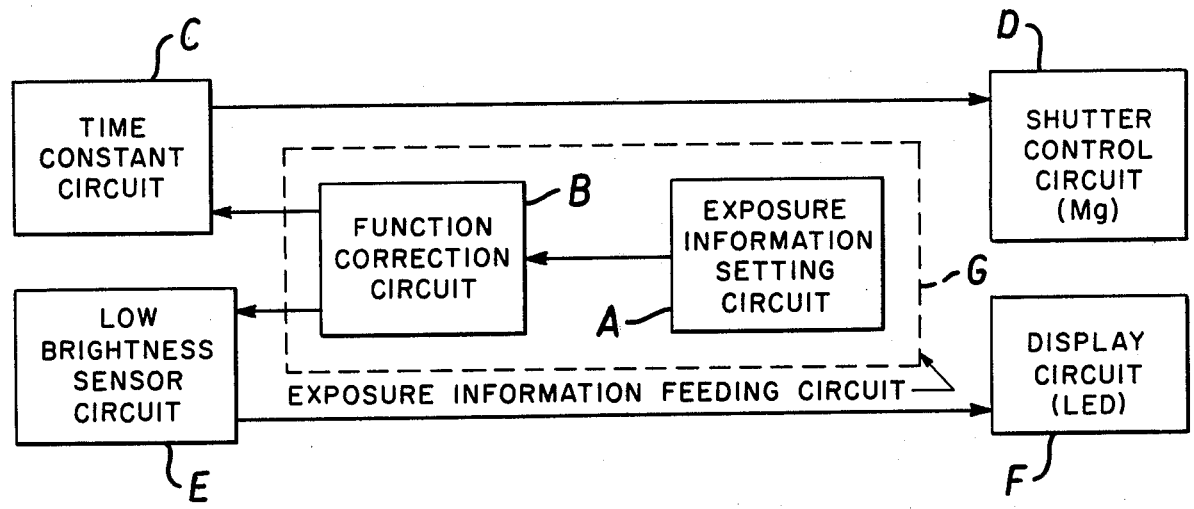
FIG. 1 is a block diagram for the shutter circuit having an exposure information feeding circuit in accordance with the present invention.

Referring now to the drawings, a preferred embodiment of the present invention will be described.

In FIG. 1 is shown a block diagram for an electric shutter circuit having an exposure information feeding circuit of the present invention wherein a reference character A is an exposure information setting circuit, B is a function correction circuit, C is a time constant circuit, D is a shutter control circuit, E is a low brightness sensor circuit and F is a display circuit. The exposure information setting circuit A and the function correction circuit B form an exposure information feeding circuit which is illustrated by an enclosure of dotted line G in the drawing. As described above, in order to represent exposure information such as ASA sensitivity, etc. with an electric signal, such as voltage for example, and further to feed the electric signal to the time constant circuit C and the low sensitivity sensor circuit E, it should be required that some variation in the output from each of the circuits corresponds to variation of the exposure information. In reference to this fact, in order to provide an efficient operation for the two circuits having respective functions represented by the different equations, it should be required to arrange the function correction circuit B between the exposure information setting circuit A and at least one of the time constant circuit C and the low brightness sensor circuit E. And it is possible to provide a shutter control circuit D, such as a magnet, for use in controlling the shutter that is operated by the output from the time constant circuit C to perform the exposure operation. The display circuit F having an LED, etc. is operated by the output from the low brightness sensor circuit E and then an alarm display may be made.

Figure 2:
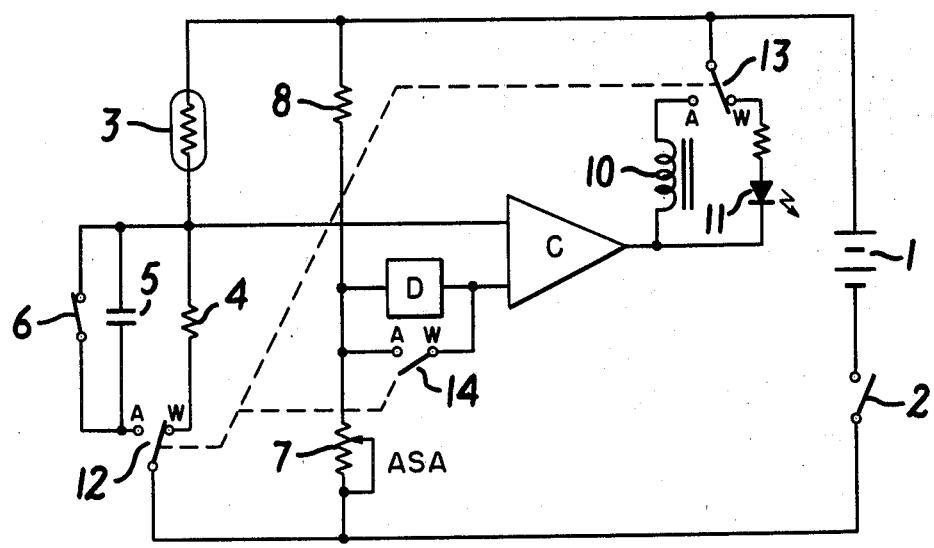
FIG. 2 shows one preferred embodiment of the shutter circuit having an exposure information feeding circuit in accordance with the present invention.
Figure 3:
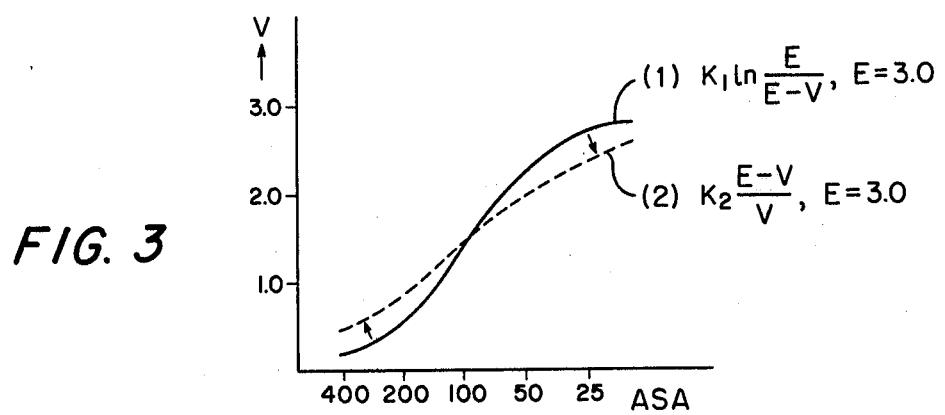
FIGS. 3 and 7 indicate illustrative characteristic curves for the preferred embodiment of the present invention.

FIG. 2 shows one preferred embodiment of the present invention wherein reference numeral 1 shows a power supply and 2 is a power supply switch. 3 indicates a photoelectric element, 4 is a comparison resistance, 5 is a time constant capacitor, 6 is a timing switch operated in synchronism with the releasing operation of the shutter, 7 is a variable resistor for use in setting exposure information such as ASA etc. and 10 is a shutter control magnet. And 11 is a low brightness alarm display LED, 12, 13 and 14 are a mode change-over switch to perform a change-over between a mode w for making a low brightness alarm and a shutter control mode A. Reference character C is a voltage comparator and D is a function correction circuit. The operation for the two circuits will be described now, when the mode change-over switches 12, 13, 14 are as shown in the drawings set to the low brightness alarm side. At first when the power supply switch 2 is turned on, each of the parts in the circuit receives an applied voltage. Then a fractional or partial voltage corresponding to the brightness is generated by the comparison resistance 4 and applied to one of the inputs of the comparator C. This input voltage is high when the object is bright and low when the object is dark. The partial voltage corresponding to a selected ASA sensitivity is generated across the variable resistor 7 by both ASA sensitivity setting variable resistor 7 and the resistor 8, and the value is already set to correspond to ASA sensitivity information of the time constant circuit to be described later. Thus, in case of the low brightness alarm mode, said partial voltage is applied to the other input of the comparator C via the function correction circuit D, resulting in a reference voltage for the comparator. Said function correction circuit D is used as described above for correcting a logarithmic function to a fractional function, and then the function will be as shown in FIG. 3. In the drawing or graph, V is a reference voltage, E is a power supply voltage (30 V), $K_1$, $K_2$ are constants. The equation (1) shows the relation between ASA sensitivity and the reference voltage V in the time constant circuit, resulting in a logarithmic function. To the contrary, the equation (2) shows the relation between ASA sensitivity and the reference voltage V in the low brightness alarm circuit, resulting in a fractional function. The function correction circuit changes the curve of (1) to the curve of (2). Thus, an applied reference voltage and a voltage corresponding to brightness are compared with each other in the comparator C, the display LED 11 will be lit by the output from the comparator when the object is dark and then the low brightness alarm display is made.

When it is desired to release the shutter, the cooperative switches 12, 13 and 14 are changed over the w side to the A side. That is, one of the inputs of the comparator is connected to the time constant circuit comprised of the photoelectric element 3 and the time constant capacitor 5, and the other input directly receives a voltage developed across of ASA sensitivity setting variable resistor 7, and the output from the comparator C is connected to the shutter control magnet 10. Upon mechanical releasing of the shutter caused by depressing the shutter release button (not shown), the timing switch 6 is released. Since the photoelectric element 3 has a resistance value corresponding to a brightness of the object, an electric current corresponding to the brightness flows in the capacitor 5 and then the capacitor is charged. When this charging voltage is equal to the reference voltage applied to the comparator C, an electric current in the magnet 10 is cut off resulting in a closing of the shutter. In this way, the exposure time corresponding to a brightness of the object is automatically provided. ASA sensitivity setting at this time is performed by the variable resistor 7 and so the reference voltage V of the comparator C is already set to correspond to a particular value of ASA sensitivity.

Figure 4:
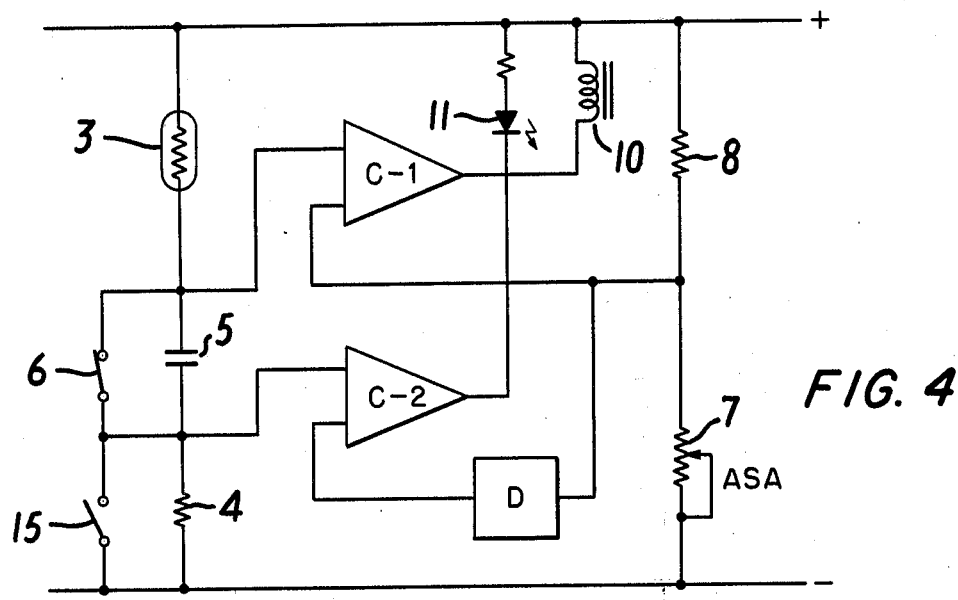
FIGS. 4, 5 and 8 show alternative embodiments of the present invention.

FIG. 4 shows another preferred embodiment of the present invention in which the comparator C-1 for the time constant circuit and the comparator C-2 for the low brightness sensing are separately provided. In the drawing, elements shown in FIG. 2 having the same reference numerals as in FIG. 1 have the same function as the corresponding elements shown in FIG. 1. A power supply and a power supply switch are not illustrated. In the condition shown, the low brightness alarm mode is set and the switch 15 is kept open. Since the timing switch 6 is kept closed, a partial voltage circuit is comprised of the photoelectric element 3 and the comparator resistor 4, and the output from the partial voltage circuit is connected to one input terminal of the low brightness sensing comparator C-2. The input is as already described a voltage corresponding to the brightness. ASA sensitivity information is fed by the variable resistor 7 in the same manner as shown in FIG. 2, connected to another input of the low brightness sensing comparator C-2 via function correction circuit D, resulting in providing the reference voltage. When both voltages are compared in the comparator C-2 and the voltage corresponding to the brightness is lower than the reference voltage, that is, in case of a low brightness in which the exposure time is longer than for example 1/30 second, an alarm display is made by LED 11 connected to the output of the comparator C-2. Then, when the shutter is to be released, the switch 15 is closed. Further, the timing switch 6 is opened in synchronism with the opening operation of the shutter and the time constant capacitor 5 is charged via photoelectric element 3. The charging voltage is compared with the reference voltage applied as ASA sensitivity information by the comparator C-1 for the time constant circuit, and upon both values being equal to each other, an electric current flowing to the shutter control magnet 10 is cut off and then the shutter is closed. The function correction circuit D in the preferred embodiment is used for changing a logarithmic function to a fractional function in the same manner as described in reference to the preferred embodiment shown in FIG. 2.

Figure 5:
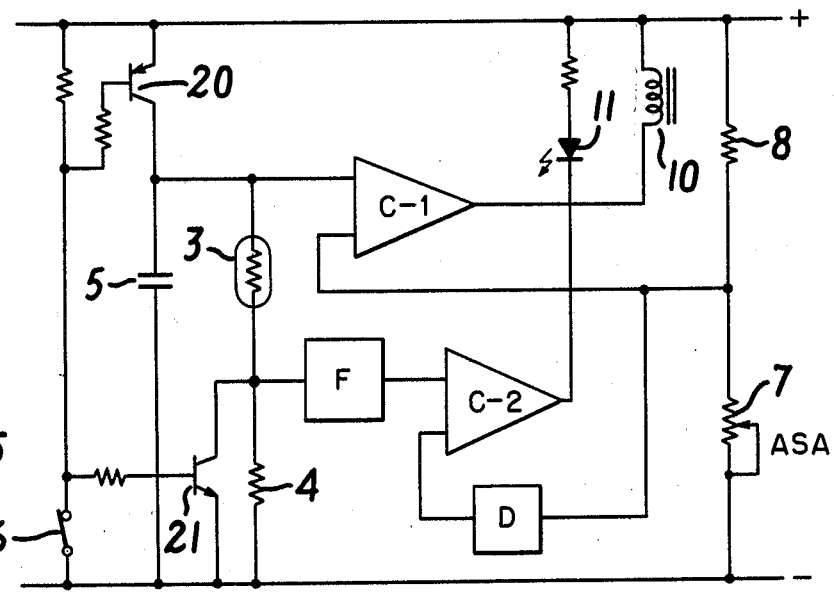
Figure 7:
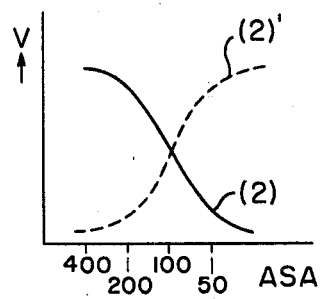

FIG. 5 shows another preferred embodiment of the present invention wherein a shutter exposure time is determined by a discharge of the time constant capacitor 5, and a mode change-over from the low brightness alarm to the shutter operation is performed by the timing switch 6 in synchronism with the opening operation of the shutter. The operation will be described where a low brightness alarm mode is set with the timing switch 6 closed. The transistor 20, having an emitter connected to a positive pole of the power supply and a collector connected to one side of the time constant capacitor 5, is rendered conductive, and the transistor 21, having a collector and emitter connected across the comparison resistor 4, is rendered non-conductive. Thus, a voltage corresponding to brightness is generated by a partial voltage circuit having a photoelectric element 3 and the comparison resistor 4, and the voltage is applied to one input of the low brightness sensing comparator C-2 via a phase reversing circuit F. Since an operation of the time constant circuit is performed by the discharging of the capacitor 5, in case ASA information is fed a variation in the reference voltage should be opposite to that of the circuit shown in FIGS. 2 and 4. That is, as shown in FIG. 7 indicating the relation, the curve shown by the dotted line (2)' is for the preferred embodiment of FIGS. 2 and 4 and corresponds to the solid line curve (2) for the preferred embodiment of FIG. 5. Thus, at the reference voltage of the low brightness sensing comparator C-2, it is absolutely required to provide the function correction circuit D as already described and in addition a phase of the voltage corresponding to a brightness of the object is reversed by the phase reverse circuit F and then fed to the input of the low brightness sensing comparator C-2. The operation of the function in correction circuit is the same as that described in the previous embodiment and its description is omitted here. When the timing switch 6 is opened in synchronism with the opening operation of the shutter, the transistor 20 is rendered non-conductive and the transistor 21 is rendered conductive. Then, a low brightness alarm mode is changed over to a shutter operation mode, an electric charge stored in the time constant capacitor 5 is discharged via photoelectric element 3 and the transistor 21. This discharging voltage is fed to one input of the time constant circuit comparator C-1, compared with the reference voltage indicating ASA sensitivity information, and when the two voltages coincide a reverse signal is generated and an electric current in the shutter control magnet 10 is shut off so the shutter is closed.

Figure 6:
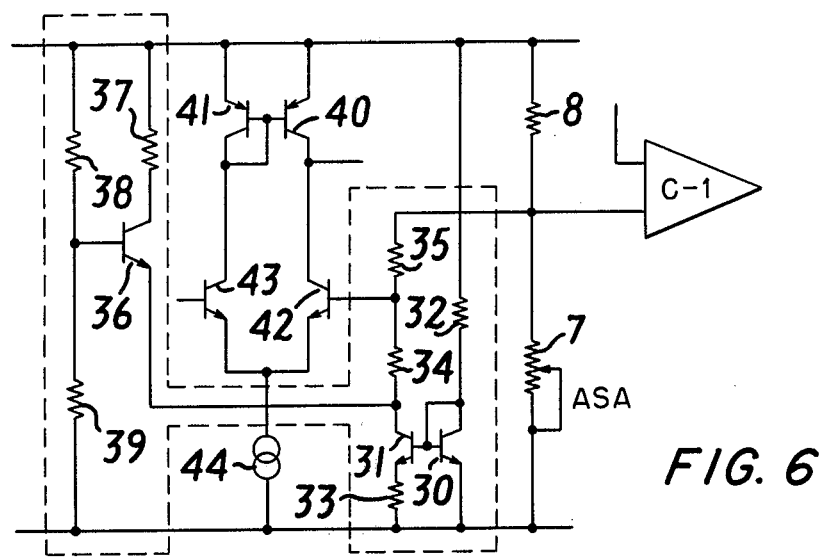
FIG. 6 shows one preferred embodiment of a function correction circuit of the present invention.

In FIG. 6 is illustrated one example of a function correction circuit. In the drawing, 7 is the ASA sensitivity setting variable resistor, 31, 36, 40, 42 and 43 are transistors, and 30 and 41 are transistor with the structure of a diode, 44 is a current source, and, 8, 32, 33, 34, 35, 37, 38 and 39 are resistors. The enclosed part shown by the dotted line corresponds to the function correction circuit D, the transistor 42 is a reference voltage input transistor of the low brightness sensing comparator C-2, the transistor 43 is a reverse input transistor of the comparator C-2. A voltage corresponding to ASA sensitivity is set across the ASA setting variable resistor 7 and fed to the low brightness sensing comparator C-2 (the base of the transistor 42) via resistor 35. The transistor 31 forms a constant current circuit, the resistor 34 is connected between the collector of the transistor 31 and the resistor 35 which in turn is connected to the input of said comparator C-2. Thus, when such a voltage as required for feeding ASA sensitivity information developed across the variable resistor 7 is sufficiently high, a specified electric current flows to the resistors 35 and 34 and the transistor 31, and thus the reference voltage is dropped by an amount corresponding to a terminal voltage at the resistor 35. To the base of the transistor 36 is applied a partial voltage developed by the resistors 38 and 39, and its emitter is connected to a collector of said specified current transistor 31. When a setting voltage for ASA sensitivity information is decreased, a reverse electric current flows from the transistor 36 via resistors 34 and 35, thus in this case, a reference voltage in the comparator C-2 is increased by the voltage at the terminal of the resistor 35. As already described in reference to FIG. 3, a correction from the curve (1) to the curve (2) is preferably made such that when ASA sensitivity setting voltage is high, the reference voltage is corrected to a lower value, and in turn when the setting voltage is low, the reference voltage is corrected to a higher value. ASA sensitivity information is simultaneously fed to the time constant circuit and the low brightness sensor circuit by approximately correcting the curve (1) to the curve (2) by applying the function correction circuit as described above.

Figure 8:
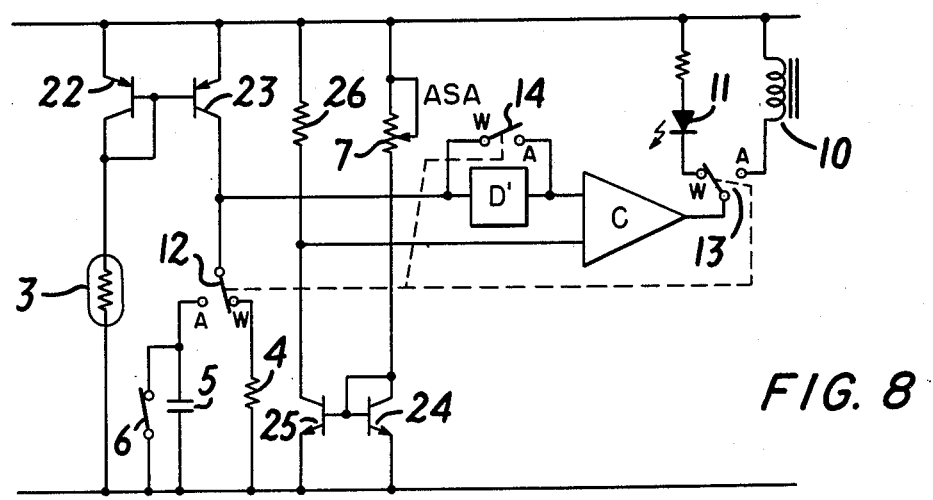

In FIG. 8 is shown another preferred embodiment in which a resistance value of the photoelectric element is replaced with a specified electric current by a current mirror circuit. Brightness information provided by the photoelectric element 3 is replaced with a voltage compressed by the diode 22 and further converted to an electric current extended by the transistor 23, and electric current is applied to the comparison resistor 4 to perform a low brighness alarm operation, or the time constant capacitor 5 is charged to perform shutter control.

In turn, ASA sensitivity information is fed via variable resistor 7 and similarly replaced with a specified electric current by diode 24 and transistor 25, and electric current is fed to the resistor 26 to set the reference voltage. A function correction circuit D' is arranged between a collector of the transistor 23 and one of the inputs of the comparator C, and effectively operated by the switch 14 only in case of the low brightness alarm mode. In the preferred embodiment as already described, a comparator input is set to a reference voltage as described, and in a latter preferred embodiment, a correction circuit is arrangement at a reverse input of the comparator.

The preferred embodiments have already been described above, and in accordance with the present invention, there is provided an electric shutter having a shutter control time constant circuit and a low brightness sensor circuit wherein an exposure information setting circuit electrically applies exposure information such as ASA sensitivity or F-value, for example as a voltage value, and the accommodated exposure information is simultaneously applied to a time constant circuit and a low brightness sensor circuit. Thus, it is possible to provide electric feeding of the exposure information and only one information setting circuit is sufficient to make the present invention, so that the invention may provide a substantial effect of reducing space therefor when the same is actually installed in a camera, or provide a highly free movement for its arrangement.

We claim:

1. An exposure information feeding circuit in an electric shutter having a time constant circuit including a photoelectric element and a capacitor, a shutter control magnet connected to an output from said time constant circuit, a low brightness sensor circuit including a partial voltage circuit comprised of a comparison resistor and said photoelectric element for producing a voltage corresponding to a brightness of an object, and a display circuit connected to an output of said low brightness sensor circuit, characterized in that there is provided an exposure information setting circuit having a function correction circuit for correcting exposure information applied by said exposure information setting circuit to the time constant circuit or the low brightness sensor circuit in order to apply a reference voltage representative of the exposure information other than brightness information to said time constant circuit and the low brightness sensor circuit.

2. An exposure information feeding circuit in an electric shutter as set forth in claim 1, wherein said time constant circuit includes a comparator for comparing a reference voltage with an output from an integration circuit including said photoelectric element and said capacitor, a partial voltage circuit is comprised of said photoelectric resistor connected in series with said comparison resistor, and a low brightness sensor circuit includes means for applying an output from said partial voltage circuit to said comparator.

3. An exposure information feeding circuit in an electric shutter as set forth in claim 1 wherein the time constant circuit is composed of said photoelectric element, an integration circuit comprised of said capacitor and a first comparator, and the low brightness sensor circuit is comprised of a partial voltage circuit including said photoelectric element and the comparison resistor connected in series, and a second comparator for comparing the output from said partial voltage circuit with a reference voltage.

4. An exposure information feeding circuit in an electric shutter as set forth in claims 2 or 3, further comprising a current mirror circuit for converting either the output from the photoelectric element or the resistance value to a specified electric current.

5. In an exposure control circuit having a brightness sensing mode and an exposure control mode:
   brightness sensing means responsive to compensating signals and including a photoelectric element for sensing brightness;
   exposure timing means responsive to compensating signals and including said photoelectric element for generating a signal to determine exposure time; and
   compensating signal generating means for generating and for applying exposure compensating signals representative of an exposure parameter other than brightness to said brightness sensing means and said exposure timing means to compensate the brightness sensed and the exposure time determined according to the exposure parameter, said compensating signal generating means including correcting means for correcting the exposure compensating signals for differences between the characteristics of said brightness sensing means and the characteristics of said exposure timing means.

6. In an exposure control circuit having a brightness sensing mode and an exposure control mode:
   brightness sensing means responsive to compensating signals and including a photoelectric element for sensing brightness;
   exposure timing means responsive to compensating signals and including said photoelectric element for generating a signal to determine exposure time;
   compensating signal generating means for generating and for applying exposure compensating signals representative of an exposure parameter other than brightness to said brightness sensing means and said exposure timing means to compensate the brightness sensed and the exposure time determined according to the exposure parameter, said compensating signal generating means including correcting means for correcting the exposure compensating signals for differences between the characteristics of said brightness sensing means and the characteristics of said exposure timing means; and
   a D. C. power source and means for applying the D.C. output of said D. C. power source to power said brightness sensing means, said exposure timing means and said compensating signal generating means.

7. In an exposure control circuit according to claim 5 or 6, said brightness sensing means comprising said photoelectric element and a sensing resistor connected in series with said photoelectric element.

8. In an exposure control circuit according to claim 7, said exposure timing means comprising said photoelectric element and a timing capacitor connected in series with said photoelectric element, and said exposure control circuit further comprising switching means for switching between a brightness sensing mode with said photoelectric element and said sensing resistor connected in series and an exposure control mode with said photoelectric element and said timing capacitor connecting in series.

9. In an exposure control circuit according to claim 5 or 6, said compensating signal generating means comprising a voltage divider circuit including a fixed resistor and a variable resistor adjustable according to an exposure parameter for changing an output voltage of the voltage divider circuit according to the exposure parameter, and the exposure control circuit including a voltage comparator circuit having a first input connected to receive a voltage developed across said photoelectric element and a second input connected to receive the voltage divider output signal.

10. In an exposure control circuit according to claim 9, said correcting means for correcting the exposure compensating signals is connected between said voltage divider circuit and the second input of said comparator circuit, and said switching means is effective to bypass said correcting means and apply the voltage divider output signal directly to the second input of said comparator circuit according to the mode of operation of the exposure control circuit.

11. In an exposure control circuit according to claim 10, a shutter control electromagnet, a display element responsive to electrical signals, and said switching means being effective for applying the output of said comparator to said shutter control magnet in the exposure control mode and for applying the output of said comparator to said display element in the brightness sensing mode.

12. In an exposure control circuit according to claim 5 or 6, said compensating signal generating means comprising a voltage divider circuit including a fixed resistor and a variable resistor adjustable according to an exposure parameter for changing an output voltage of the voltage divider according to the exposure parameter, said exposure timing means including a first voltage comparator having a first input connected to receive a voltage developed at said photoelectric element when the exposure control circuit operates in the exposure control mode and said voltage comparator having a second input, said brightness sensing means including a second voltage comparator having a first input connected to receive a voltage developed at said photoelectric element when the exposure control circuit operates in the brightness sensing mode, said voltage divider circuit being connected for applying the divider circuit output voltage to a second input of a respective one of said comparator circuits, and said correcting means being connected between said voltage divider circuit and a second input of the other one of said comparators for applying a corrected output voltage from said voltage divider circuit to the other one of said comparators.

13. In an exposure control circuit according to claim 5 or 6: wherein said means for correcting the exposure compensating signals comprises means for generating compensating signals having a logarithmic function of an exposure parameter other than brightness and means for generating compensating signals having a fractional function of the exposure parameter other than brightness.

14. In a camera shutter control circuit, the combination comprising:

light sensing means for sensing light intensity and for generating an electrical output signal having an amplitude representative of light intensity, said light sensing means including a voltage divider comprised of a photoelectric element and a comparison resistor connected in series with said photoelectric element and having a D.C. voltage applied in use across said series combination of said photoelectric element and said comparison resistor for developing across said comparison resistor a voltage representative of the intensity of light incident on said photoelectric element;

a time constant circuit comprised of said photoelectric element and a capacitor connected in series with said photoelectric element, said time constant circuit having said D.C. voltage applied in use across said series combination of said photoelectric element and said capacitor for developing across said capacitor an increasing voltage having a rate of increase determined by the intensity of light incident on said photoelectric element;

reference signal generating means for generating a first electrical reference signal having a magnitude equal to a fractional function of an exposure parameter other than brightness and for generating a second electrical reference signal having a magnitude equal to a logarithmic function of the exposure parameter;

signal comparison means for comparing the magnitude of a pair of electrical signals applied thereto and for developing an output signal indicating the larger of the applied electrical signals;

an electrically energizable visual indicator and electrically energizable means for maintaining a camera shutter in an open condition and connected to receive the output of said signal comparison means; and switching means for applying the second electrical reference signal and the light sensing means output signal to said signal comparison means and for applying the signal comparison means output signal to energize said visual indicator when the second electrical reference signal has a magnitude greater than the light sensing means output signal to operate the camera shutter control circuit in a low brightness alarm mode, and for alternatively applying the first electrical reference signal and the time constant circuit output signal to said signal comparison means and for applying the signal comparison means output signal to said means for maintaining a camera shutter in an open condition when the first electrical reference signal has a magnitude greater than the time constant circuit output signal to operate the camera shutter control circuit in an exposure control mode.

15. In a camera shutter control circuit according to claim 14: a D.C. power source for applying a D.C. electrical signal to power said light sensing means and said time constant circuit.

* * * * *